(No Model.)
A. W. McWILLIAMS.
ANIMAL POKE.
No. 506,603. Patented Oct. 10, 1893.
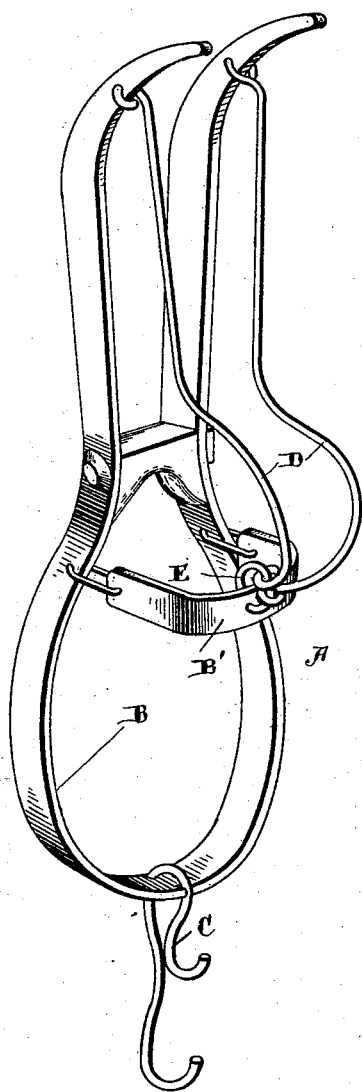

UNITED STATES PATENT OFFICE.

ANDERSON W. McWILLIAMS, OF KOSSE, TEXAS.

ANIMAL-POKE.

SPECIFICATION forming part of Letters Patent No. 506,603, dated October 10, 1893.

Application filed August 11, 1893. Serial No. 482,937. (No model.)

*To all whom it may concern:*

Be it known that I, ANDERSON W. MCWILLIAMS, of Kosse, in the county of Limestone and State of Texas, have invented certain new and useful Improvements in Animal-Pokes; and I do hereby declare the following to be a full, clear, and exact description of the invention, such as will enable others skilled in the art to which it pertains to make and use it, reference being had to the accompanying drawing, which forms part of this specification.

My invention relates to improvements in animal pokes, and it consists in the combination and arrangement of parts which will be fully described hereinafter and particularly referred to in the claims.

The object of my invention is to provide a yoke or poke for animals, which will prevent them from forcing their way through fences, and also from jumping.

The accompanying drawing is a perspective view of my invention.

A indicates a yoke, made of wood or metal, as may be preferred, which has its lower end B, made oval in form to pass around the animal's neck just in rear of the horns and to rest in a vertical position. The upper ends of this oval portion extend upward a suitable distance and are curved forward, for a purpose to be explained presently. A brow band B' is connected with the oval portion by means of links, and is preferably made of a flat piece of wood or metal. However, if desired, it may be made of ropes, the object being to prevent the yoke from being forced backward upon the neck of the animal. A double hook C is suspended from the lower portion of the oval of the yoke, for the purpose of catching in the wires of a fence should the animal attempt to jump, or when attempting to force his head through the fence. Two bars D have their lower ends connected with the center of the brow band, preferably by means of a ring E, and are then extended forward between the horns, and thence upward, and are connected to the upwardly extending portion B of the yoke, below their ends. The object of these rods, is to extend out in front of the animal's head, so that when he attempts to put his head through the fence the rods will engage the wires or panels thereof, forcing the upper end of the yoke backward and the lower end forward under the jaw of the animal, thus raising his head and preventing him from forcing his head through the fence. By using the bars extending from the brow band upward the animal is unable to get his horns through the fence before the said bars engage the wires and force the lower portion of the yoke under the jaw, which will be found very effective, for if the horns are prevented from getting through the fence, the animal can do but little in the way of tearing it down or forcing his way through the wires or panels thereof. The outwardly curved portions of the said bars also tend to force the wires upward to the upper end of the yoke, thus increasing the leverage for forcing its lower end upward against the under side of the animal's jaw. From the above description it will be seen that a very simple arrangement is provided for preventing the animal getting his head through a fence for the purpose of grazing, which is the inducement for the animal breaking through the fence.

Having thus described my invention, what I claim, and desire to secure by Letters Patent, is—

1. An animal yoke comprising a yoke having upwardly extending ends, a brow band, and rods connecting the brow band and the upwardly extending ends of the yoke, substantially as set forth.

2. An animal yoke comprising a yoke having upwardly extending ends, a brow band, and rods connecting the brow band and the upwardly extending ends, the said rods having their lower ends bulged outward from the animal's head, substantially as shown.

In testimony whereof I affix my signature in presence of two witnesses.

ANDERSON W. McWILLIAMS.

Witnesses:
WM. CUSTARD,
H. M. STEPHENS.